United States Patent [19]
Wilson

[11] 3,942,113
[45] Mar. 2, 1976

[54] REMOTE ENGINE SPEED INDICATOR SYSTEM

[75] Inventor: James A. Wilson, Vergennes, Vt.

[73] Assignee: Exxon Research and Engineering Company, Linden, N.J.

[22] Filed: June 5, 1974

[21] Appl. No.: 476,573

[52] U.S. Cl. .............................. 324/170; 324/16 R
[51] Int. Cl.² ............................................ G01P 3/48
[58] Field of Search........ 324/169, 170, 173, 15–18, 324/78

[56] References Cited
UNITED STATES PATENTS

| | | | |
|---|---|---|---|
| 2,999,168 | 9/1961 | Henry | 324/78 X |
| 3,601,773 | 8/1971 | Frieling | 324/170 |
| 3,811,089 | 5/1974 | Strzelewicz | 324/170 |

OTHER PUBLICATIONS
Benrey, R. M., "Build Your Own Wireless'Tach," Popular Science, Mar. 1965, pp. 110–112.

Primary Examiner—Alfred E. Smith
Assistant Examiner—Rolf Hille
Attorney, Agent, or Firm—F. Donald Paris

[57] ABSTRACT

A system for indicating engine speed without physically contacting the engine, including a tachometer comprising an inductive loop which may be buried in the ground and connected to an electrical amplifying system which picks up very low frequency radio frequency (RF) pulses from the ignition system of an automobile or other vehicle whose engine is located above the loop. The tachometer includes controls for selecting the number of engine cylinders corresponding to the vehicle being tested and a meter readout providing a visible or other suitable indication of the vehicle's engine speed. Undesirable background noises are substantially eliminated by the pickup loop design and its orientation, input signal filtering, power line filtering, base line signal rejection and automatic gain control.

14 Claims, 6 Drawing Figures

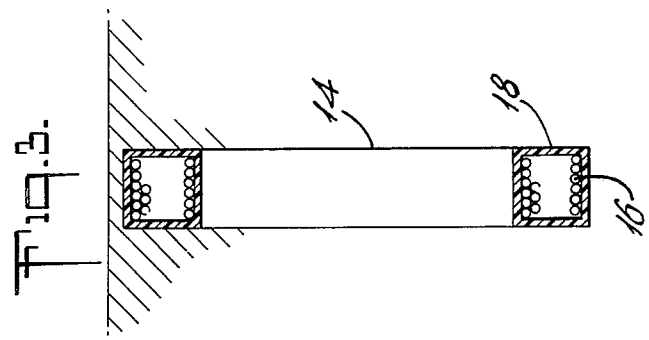
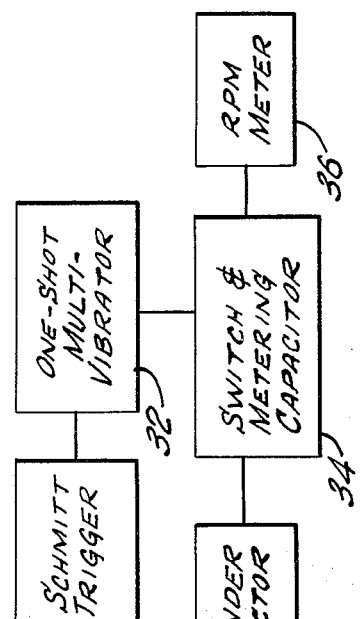
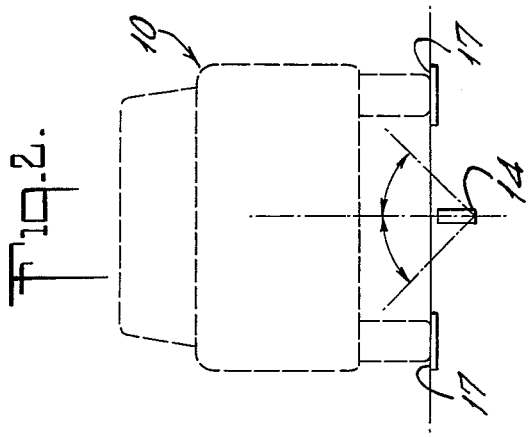
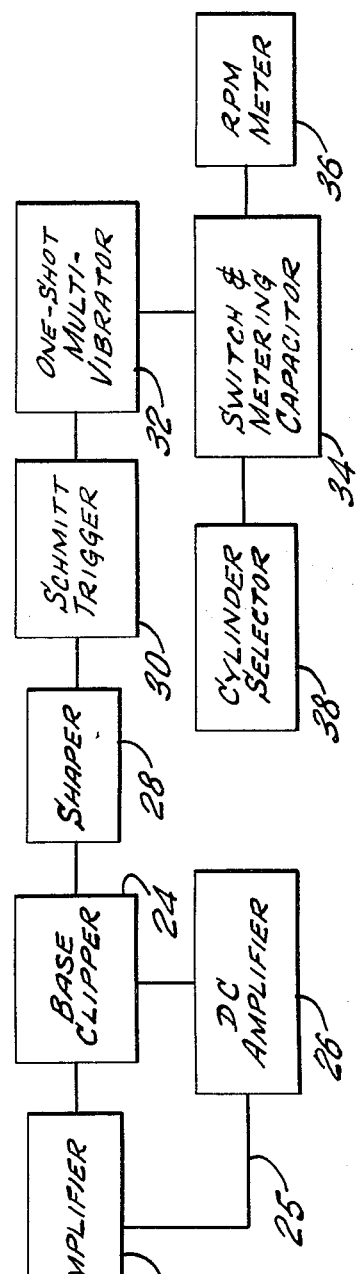
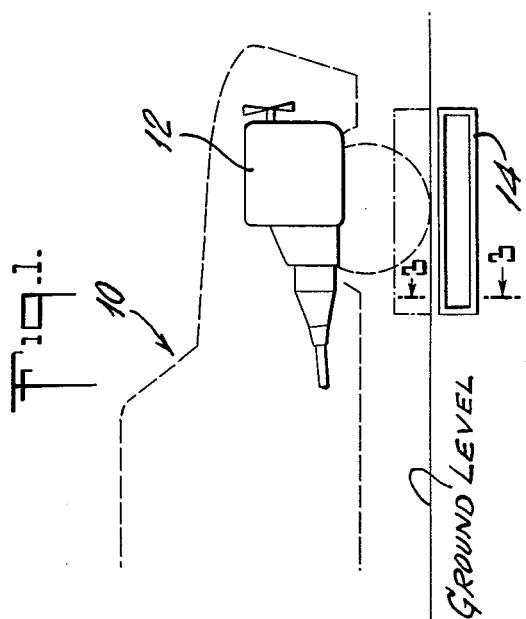
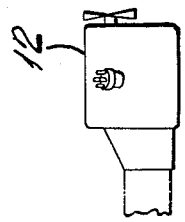

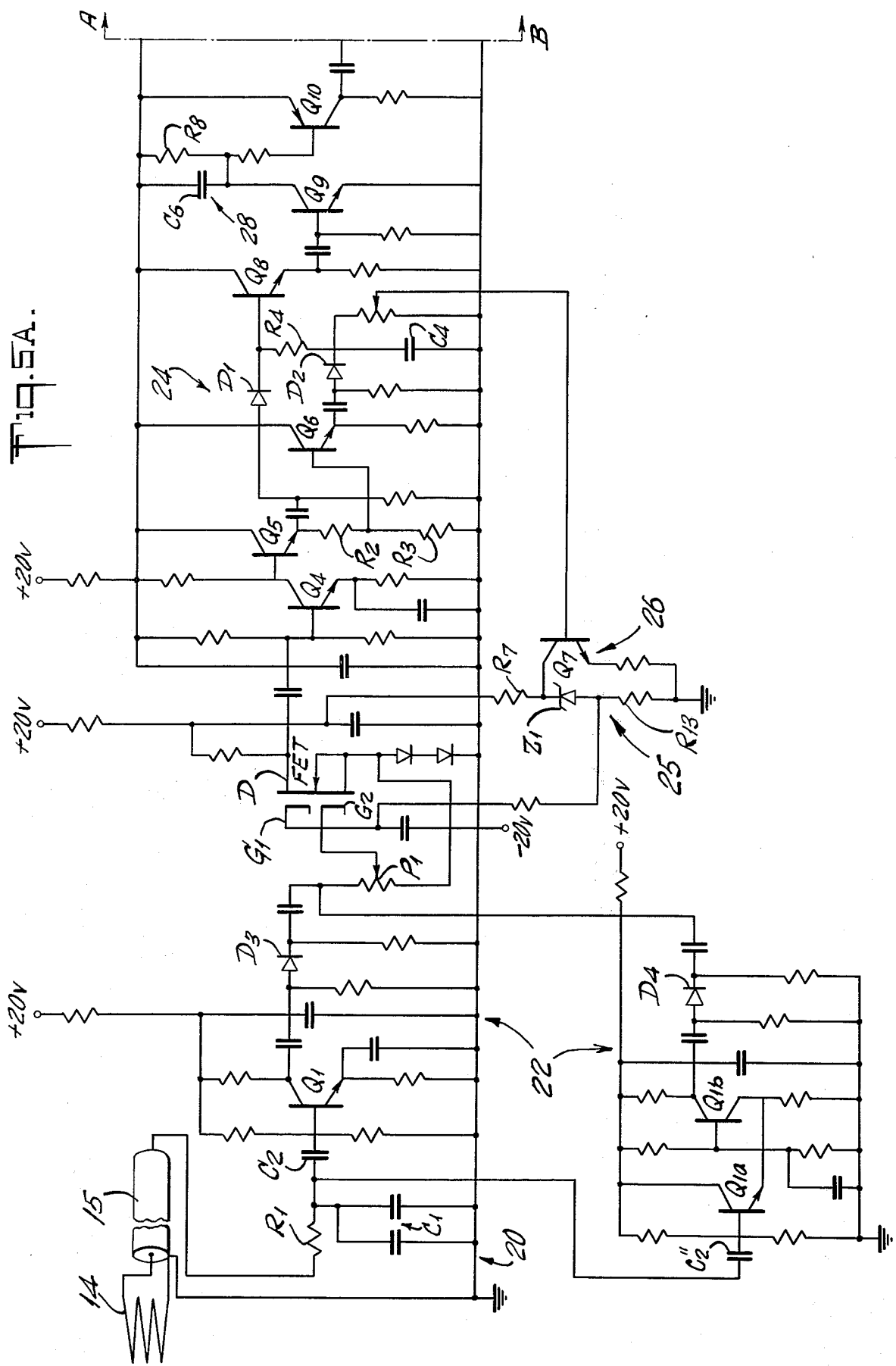

REMOTE ENGINE SPEED INDICATOR SYSTEM

BACKGROUND OF THE INVENTION

With the advent of various state and federal regulations pertaining to the inspection of automobiles and other vehicles for excessive exhaust pollution and the like, it is desirable if not necessary to have devices which can properly evaluate a vehicle's performance during operation and provide an indication as to whether or not the vehicle is operating properly from an air pollution standpoint. In some cases, this requires that the vehicle's engine run at a predetermined speed (RPM) during tests such as exhaust gas evaluation. Thus, in the case of state inspection agencies responsible for testing these vehicles, when carbon monoxide (CO) and hydrocarbons (HC) are measured during idle conditions (typically 500–800 RPM) or at higher engine speeds of approximately 2500 RPM, it is necessary to know within a permissible deviation the RPM of the engine of the vehicle undergoing testing. Obviously, there are other occasions (e.g., regular performance or pre-inspection checkups) when the vehicle owner will desire to have an automotive exhaust evaluation made. Preferably, and particularly in high volume inspection situations, it is desirable to have a device that can provide a measure of the engine speed without the need for a physical connection between the device and the engine of the vehicle being tested, as a companion inspection tool for the easily inserted tail pipe probe used for HC and CO concentration measuring instruments.

It is also necessary to provide an RPM measurement of engine speed which is relatively accurate and preferably in the range of about 5% of the actual engine speed. Typically, conventional methods for detecting signals generated by the spark ignition system of a vehicle's engine have been able to provide good results only by very close coupling of the pickup device to the high tension leads from the spark coil or by direct connection to the spark coil primary circuit on the spark-ignited engine. In these systems, the electrical signal for each firing is detected by the pickup device and processed through suitable electronic equipment, whereupon engine RPM is indicated on a suitable readout means. A typical prior art disclosure of such a system is disclosed in U.S. Pat. No. 3,601,773.

Another requirement for a preferred system is that it be selective to receive only ignition signals, and substantially free of interference from nearby operating vehicle engines which may be undergoing test or just in the vicinity for some other reason. Other unsuccessful prior art attempts at overcoming these and other related problems also include U.S. Pat. Nos. 3,573,609 and 3,656,059; and further prior art considered in connection with this invention include U.S. Pat. Nos. 3,611,138, 3,005,155 and 3,404,339.

The prior art, while generally disclosing the broad concept of providing a remote tachometer for sensing engine speed, without the need for a physical connection between the engine and the tachometer, the various problems associated with the prior art (e.g., interference by surrounding operating engines) have made such prior art devices and systems impractical. In connection with the production by spark-ignition engines of radio signals with each ignition pulse, and the processing of such signals to provide an indication of engine speed, a significant problem associated therewith is that these signals (radio frequency) emitted by the ignition system vary in intensity from cylinder to cylinder for each particular engine and car, and also from car to car. The RF signals from cylinder to cylinder vary due to mixture conditions at the gap when the plug fires and due to variations in plug and wiring conditions. As for the RF signals between cars, they vary because of ignition system design and associated conditions. Further, various other devices in the car will generate RF signals which cause false pulses to appear at the pickup device. Finally, a highly sensitive pickup device will pick up RF signals not associated with the car and which will cause further false signals to appear. By the use of the term "RF signal", it is meant to include such signals that fall within a frequency range from approximately 10 KC and below to 100 MC.

SUMMARY OF THE PRESENT INVENTION

The present invention overcomes these and other deficiencies of the prior art, by providing a novel remote RPM indicator system, particularly for use with spark ignition engines wherein preferably an inductive loop is located at a predetermined distance below the engine for picking up electrical impulses produced by the spark ignition system of the internal combustion engine of the vehicle, which then are processed through suitable electronic circuit to provide a readout of engine RPM. According to the present invention, the inductive pickup loop can be spaced or remote relative to the engine and is selective to only ignition signals, being substantially free from interference by nearby engines and other RF producing means.

According to this invention, the inductive pickup loop detects the electrical field around the engine which is generated by the spark ignition system. The field may be electromagnetic or electrostatic. The inductive pickup loop detects the field and preferably is located beneath the engine area, buried in the ground completely or partially. Alternatively, the loop may be portable and located at ground level or placed under a raised vehicle if necessary. The output from the pickup loop is connected to electronic processing circuitry and readout means, which eliminates spurious RF signals that could interfere with obtaining an accurate RPM readout. The size and shape of the loop and its relative position to the engine play an important part in the present invention. To avoid obtaining undesirably low signals from the ignition system and excessively high signals from electrical noise sources on the vehicle, it is necessary to properly position the loop, as will be apparent from this disclosure.

Accordingly, it is a primary object of the present invention to provide a remote RPM for indicating engine speed without the need for physical or close connections with the engine undergoing evaluation, which is substantially accurate in its RPM readout and is substantially free from surrounding spurious or other interfering RF signals which affect the accuracy of the RPM readout.

BRIEF DESCRIPTION OF THE DRAWINGS

FIG. 1 is a schematic illustration of the relative location of the RF signal pickup loop used in the present invention and the vehicle being tested;

FIG. 2 is a front elevational view of the relative location between the RF signal pickup loop and the vehicle, illustrating permissible vertical deviation of the loop;

FIG. 3 is a cross-section taken substantially along the line 3—3 of FIG. 1, illustrating construction details of the pickup loop;

FIG. 4 is a block diagram of the present invention comprising the RPM pickup loop connected to electronic processing circuitry for providing RPM readout of engine speed, according to the present invention.

DESCRIPTION OF THE PREFERRED EMBODIMENT

Figure 5B:
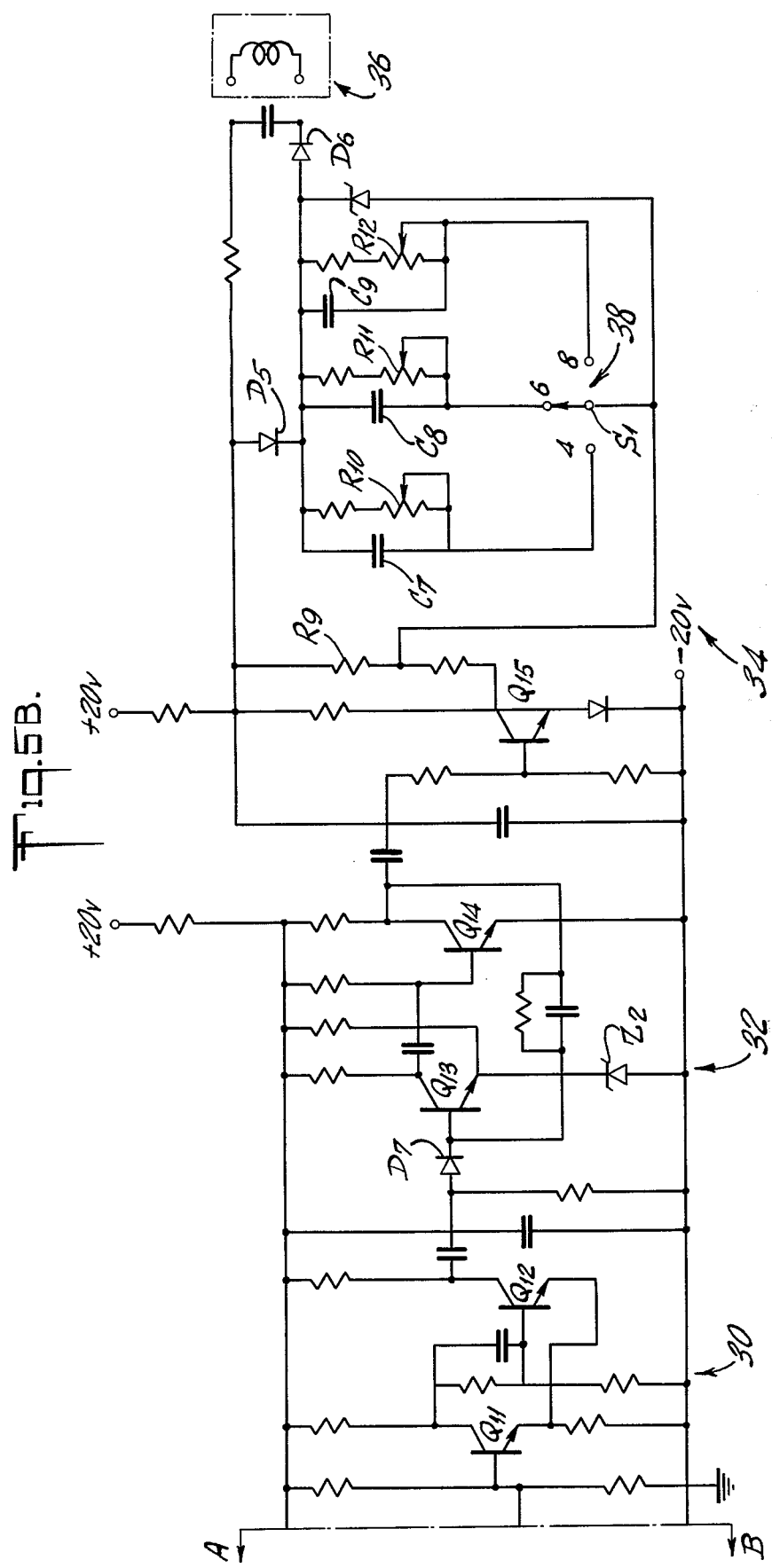
FIG. 5 is the electronic circuit diagram according to the present invention.

As shown in FIG. 1, the vehicle comprises an automobile 10, which is driven into the inspection area and located so that its engine generally designated 12 is located generally directly above a pickup loop 14 shown in solid lines located below grade. This arrangement provides a convenient self-diagnostic tool that facilitates a motorist's observation of the engine speed of his car without requiring that the driver get out of the automobile or an attendant in service. Thus, by providing a comparison of the engine RPM of the vehicle and manufacturer's RPM specification for the engine, the driver can obtain a ready indication as to whether or not engine service may be required. As shown in FIG. 2, the engine is generally centered above the loop. Properly located white lines or grooves 17 (see FIG. 2) and the like on the pavement can be provided for assisting the motorist in properly locating the car. Then a conveniently accessible dial on or connected with the readout meter is set to the number of engine cylinders for the particular vehicle and the system power is turned on, whereupon the meter readout will provide an indication, either by a conventional analogue (needle) readout or digital readout, of the engine speed. This readout will be accurate to within approximately 5% of the true engine speed and the motorist can then compare this number with the specifications for his car which can be posted on a nearby chart. Alternatively appropriate electronic circuit may be provided for comparing actual engine RPM with the engine's designed RPM, and providing a side-by-side visible comparison or readout of RPM delta between actual and designed RPM.

According to the preferred embodiment, the rectangular shaped inductive pickup loop 14 typically may comprise about 60 turns of suitable insulated copper wire wound on an appropriate form of 4½ feet by ½ foot. The number of turns and the loop size will determine the amount of inductance and consequently its frequency response. As shown schematically in FIGS. 4 and 5, the ends of the loop are connected to a coaxial cable 15 which in turn is connected to the RPM indication instrument system. While it is not critical as to what material (so long as metal is not used) covers the loop since it may be buried either in concrete or blacktop or above the ground either partly or entirely, the important thing is that the car be able to drive or be located over it. It is also important that the loop be mounted with its short plane vertically disposed under the engine area, with its length running in the same direction as the length of the engine. This provides for the best signal (ignition pulses) to noise (other RF sources) ratio. The loop should be designed to have sufficient inductance for picking up low frequency electrical fields generated by the vehicle's ignition system. Loop inductance is determined by well-known conventional techniques. The loop should have a good response to signals in the very low radio frequency range, e.g., 5–20 KC, since most spurious signals are very low level in this frequency range. The loop casing 18 comprises a nonconductive material, such as wood or plastic, which, as shown in FIG. 3, houses the internal coils or turns 16 in a rectangular-shaped casing. While the preferred embodiment of the invention shows the loop buried below grade, an alternate location is possible, such as shown by the broken line in FIG. 1 wherein all or a portion of the loop extends above ground level. Another variation is the configuration of the loop which while shown as being rectangular, be circular, elliptical, or square, etc., if desired. Whether the loop is buried completely will depend largely on the desired size of the loop and the amount of excavation necessary to bury it completely, as in the case of a circular loop.

As shown in FIG. 2, in the preferred embodiment the loop is disposed in a vertical plane substantially perpendicular to the vehicle's longitudinal axis on the ground, in order to provide the best signal to noise ratio, which is preferably a minimum of 3:1, with noise comprising any false signals. The angular deviation of the loop's short axis from the vertical may be approximately forty-five degrees, the effect of which is to provide maximum response to ignition field and reduce response to generator/alternator electrical noise and other vehicle accessory electrical noise.

Turning now to FIGS. 4 and 5, a detailed description of the operation, construction and arrangement of the present invention will be discussed. FIG. 4 shows schematically the engine 12 located above the rectangular pickup loop 14. The filter 20 functions to reduce the level of false or spurious signals such as electrical noise generated by motor brushes (known as "hash") of the engine, blowers, and other parts of the car when the engine is operating. The filter output is capacitively connected to an amplifier stage 22 for amplification to a higher signal level for processing by the following stages. The amplifier output is coupled to a base clipper stage 24 which passes only positive peaks of the amplifier output signal which are greater than one-half of the average input level and effectively rejects any noise, hash, or ripple which may appear in the bottom half of the signal. The base clipping function 24 produces a DC output voltage, in addition to the positive pulse output, which is fed back through a DC amplifier 26 to the amplifier stage 22 and functions as an automatic gain control (AGC) loop 25 so that as higher signal levels appear at the output of clipper stage 24, proportionately increased voltage signals are fed back to amplifier stage 22 for regulating the amplification accordingly. This allows the complete system to accommodate a wide range of input signal levels without overloading or responding to false signals. The pulse output signal of the base clipper, which comprises a positive going top portion of the signal, is transmitted to a shaper stage 28 which produces very clean positive output pulses. These drive a conventional Schmitt trigger circuit 30, which provides relatively sharp square output pulses for driving the conventional one-shot multivibrator 32. The pulses generated by the multivibrator 32 actuate a switching circuit 34. This circuit is set for operation in accordance with the number of cylinders in the engine undergoing testing, so that the particular selected capacitor in the circuit be a value related to the number of engine cylinders. The selected capacitor is charged and then discharged to provide a discharge current which flows through the standard RPM meter 36, which indicates RPM of the engine. An appropriate selector 38 is provided for selecting an appropriate capacitor in circuit 34 corresponding to the number of engine cylinders.

The power supply for the present invention, while not shown in detail, is of the conventional full-wave variety and typically provides properly filtered 20 volts DC output, by means of conventional filtering and regulation.

Referring now to the details of the electronic signal processing equipment for the present invention, reference is made to FIGS. 5A and 5B, shown on separate sheets for convenience of illustration. The input filter 20 comprises a series resistor $R_1$ and a capacitor $C_1$ shown as comprising two capacitors connected in parallel between the resistor and ground. With undesirable background noise eliminated, the output from filter 20 is coupled through coupling capacitors $C_2'$ and $C_2''$ to amplifier 22. In the preferred embodiment amplifier 22 comprises two parallel amplifying paths including a grounded emitter transistor $Q_1$ and conventional differential amplifier which comprises transistors $Q_{1a}$ and $Q_{1b}$. The output of the two paths are 180° out-of-phase and appear in parallel through diode $D_3$ and Diode $D_4$, which pass only positive going signals to the signal gate $G_2$ of the field effect transistor, FET, through potentiometer $P_1$. Gain control loop signals may have major positive or negative pulse characteristics due to loop connections or ignition system design. By employing a dual input signal path to the FET, the amplified signal will have stronger peaks in one direction, namely the positive direction for the preferred embodiment. The amplifier circuit can be designed so that negative going signals are applied to the gate $G_2$; however positive signals are preferred because the function of the base line clipper stage is most effective with positive signals at its input, the sign of the signal at the clipper input is the same as the sign at the FET input. This is due to two 180° inversions, one in the FET amplifier and the other in amplifier $Q_4$. The loop 14 can be connected to the processing circuit so that the signals will have a preferred sign (positive) from a particular car being tested. This will hold true for most cars, but not all because of ignition system design and physical layout. The gain control gate $G_1$ of the FET is connected so that a variable bias voltage is applied thereto through its connection with DC transistor amplifier $Q_7$, which is in the automatic gain control circuit to be discussed in detail hereinafter. The fraction of the amplified input signal from $P_1$ to the signal gate $G_2$ is manually adjusted during initial adjustment of the instrument to set the desired amplification or gain range of the FET. Some furthere minor adjustment may be required during operation. The dynamic or operational range of the automatic gain control loop 25 is typically about 20:1. Thus, an input signal to the FET can be increased up to 20 times its original value without increasing the output of the FET. The output is taken from the drain D of the FET.

While the preferred embodiment of the present invention is shown as employing a field effect transistor in the amplifier as discussed heretofore, it is also within the scope of this invention to employ a conventional bipolar AGC automatic gain control arrangement; however, the FET has better dynamic gain control characteristics and the present dual signal input improves input sensitivity and has been shown to make positioning of the loop less critical. The alternative arrangement may comprise using a conventional grounded emitter voltage amplifier with conventional variable gain provisions, such that the gain transistor of the gain control circuit is connected across the standard emitter resistor for varying the gain of transistor amplifier.

The FET drain output is conventionally coupled to a grounded emitter voltage amplifier transistor $Q_4$ connected to an emitter-follower transistor amplifier $Q_5$, which acts as a low impedance source to drive the base line clipper circuit. The output signal from the emitter of $Q_5$ is ac-coupled to the diode $D_1$, which rectifies it and passes only positive signal peaks. The emitter resistors of $Q_5$, $R_2$ and $R_3$ are selected so that half the output signal appears at the junction of emitter resistors $R_2$ and $R_3$ and is applied to emitter follower transistor $Q_6$. The output of $Q_6$ is rectified by the diode $D_2$ and appears as a positive DC voltage with respect to ground across the storage capacitor $C_4$. A load resistor $R_4$ for the diode $D_1$ is connected to the positive end of $C_4$ to provide a back bias on diode $D_1$, so that only the top half of the signal from $Q_5$ continues on through the following stages of the system. This action also serves to reject any noise, hash or ripple appearing in the bottom half of the signal which is blocked or cut off. This back bias, applied automatically through resistor $R_4$ to the diode $D_1$, varies as the input signal level varies and thus obtains a wide range of dynamic performance.

The DC voltage which develops across capacitor $C_4$ is also used to provide automatic gain control action. As the DC voltage across $C_4$ increases as a result of higher signal levels being received at the input to $Q_6$, the increased voltage is applied as base bias to the DC transistor amplifier $Q_7$, which produces an output between its collector and ground. The output circuit of $Q_7$ comprises Zener diode $Z_1$ connected to ground in series with resistor $R_{13}$. As the base bias to $Q_7$ varies, the output DC voltage likewise varies as does the amount of voltage picked off between $Z_1$ and $R_{13}$, which is applied to the gain control gate $G_1$ of the FET, thus altering its amplification characteristics. In the alternate arrangement where a bipolar transistor is utilized instead of the FET, the gain control transistor $Q_7$ is connected across the emitter resistor so that its effective collector-to-emitter resistance varies as a function of base current, to thereby reduce the shunt effect of the normal capacitor across the emitter, which in turn varies the voltage gain of that amplifier stage. An appropriate long-time constant can be provided in the automatic gain control loop in order to prevent system oscillation.

The output signal across the load resistor $R_4$ is connected to emitter follower transistor $Q_8$ which drives class C common collector transistor amplifier $Q_9$, which includes a filter and shaping network in its collector circuit comprising capacitor $C_6$ and high load resistor $R_8$. This network operates to produce well-shaped clean pulses with no high frequency spikes, commonly referred to as hash. The collector output of $Q_9$ is also DC coupled to the base of a class C amplifier $Q_{10}$ which provides positive going pulses at its output which is connected to the input of transistor $Q_{11}$.

The transistors $Q_{11}$ and $Q_{12}$ and their associated resistors and capacitors are connected to form a conventional Schmitt trigger circuit, which provides sharp square pulses at the collector output of $Q_{12}$ for driving a conventional one shot multivibrator comprising transistors $Q_{13}$ and $Q_{14}$, together with their associated resistors, capacitors and the diode $D_7$ and Zener diode $Z_2$. The multivibrator output pulses, which are well-defined (that is, they have a fixed height and a fixed width), are connected to a switching transistor $Q_{15}$ which is actuated in response to these pulses. Transistor $q_{15}$ operates so that upon application of a pulse at its base input a relatively large output collector current is obtained. The collector output of $Q_{15}$ is applied to a switch $S_1$, which is set for the number of cylinders in the engine, corresponding to the numerical designations 4, 6, and 8. As shown, depending on the selected number of engine cylinders, either of the capacitors $C_7$, $C_8$, or $C_9$ (corresponding to 4, 6, and 8 cylinders, respectively) will be charged through the diode $D_5$. After transistor $Q_{14}$ returns to its non-conducting stage (no input pulse is applied) the selected charged capacitor, $C_7$, $C_8$, or $C_9$ discharges through the series circuit comprising diode $D_6$, resistor $R_9$ and one of the resistors $R_{10}$, $R_{11}$ or $R_{12}$, which depends on the number of cylinders in the engine. The discharge current also flows through the meter 36 which provides an indication of the RPM of the engine.

Although a specific embodiment of the invention has been shown and described, and some modifications have been suggested, it will be understood that other embodiments and modifications which will occur to those of ordinary skill in the art fall within the true spirit and scope of the invention as set forth in the appended claims.

Having thus set forth the nature of the invention, what is claimed herein is as follows:

1. A system for remotely indicating the speed of a spark ignited engine in a vehicle, comprising in combination:
   a. inductive means of predetermined length constructed and arranged to have high response to ignition signals comprising low frequency radio frequency signals produced by the ignition system of the vehicle engine and having a signal to noise ratio of at least 3:1, and located substantially centrally below said engine with the length of said inductive means extending in the same direction as said engine;
   b. electronic circuit means connected with said inductive means for electronically processing signals received from said inductive means to provide at its output an indication of the engine's RPM, comprising input signal filter means for substantially reducing spurious signals contained in the input signal received from said inductive means, amplifier means connected to said filter means for receiving the filtered output signal and increasing the level thereof, clipper means for receiving the output signal of said amplifier means and passing therethrough only a predetermined portion of said output signal received from said amplifier means which is in excess of the average input level thereof whereby said clipper means substantially rejects undesirable portions of said output signal from said amplifier means which are contained in the portion thereof which does not pass therethrough, said clipper means producing output DC voltage and pulse signals, automatic gain control means connected with the output of said clipper means for feeding back DC voltage signals to said amplifier for controlling the amplification of said amplifier means in accordance with the signal level of said DC output voltage signals from said clipper means, and trigger circuit means operably connected for receiving at least part of the output signal of said clipper means and to switching circuit means having first conducting and second non-conducting modes of operation, said trigger circuit means being actuated upon receipt of predetermined pulse signals for causing said switching circuit means to assume said first conducting mode, and meter means connected with said switching circuit means so that when said switching circuit means assumes said second non-conducting mode said meter means provides an indication of the RPM of said engine.

2. The system of claim 1 wherein said inductive means comprises a continuous loop.

3. The system of claim 2, wherein said inductive loop means is located below ground level.

4. The system of claim 2, wherein said inductive loop means is located at least partially above ground level.

5. The system of claim 2, wherein said inductive loop means comprises a substantially rectangular configuration and is disposed in a vertical plane.

6. The system of claim 5, wherein said rectangular loop means includes a short side which is located in said vertical plane.

7. The system of claim 2, wherein the said inductive loop means is located at a predetermined angle relative to a vertical plane passing through the engine of said vehicle.

8. The system of claim 1, wherein said electronic circuit means includes shaping circuit means connected to the output of said clipper means for receiving said pulse signals therefrom and for producing substantially well-defined output pulses, said trigger circuit means connected to said shaping circuit means for being driven by said well-defined output pulses, whereby said trigger circuit means provides substantially sharp output pulses, said switching circuit means connected to the output of said trigger circuit means for being actuated by the output pulses thereof, said switching circuit means including a plurality of capacitors, each of which corresponds to a different number of cylinders for the engine in said vehicle, a selected one of said capacitors being charged during said first conducting mode of said switching circuit means, and meter means operably connected with said plurality of capacitors so that during said second non-conducting mode of said switching means the discharge current from said selected one of said capacitors flows therethrough to provide an indication of the RPM of said engine.

9. The system of claim 1, wherein said input filter means comprises a resistor-capacitor network.

10. The system of claim 1, wherein said amplifier means comprises parallel amplifying circuits for the filtered input signal.

11. The system of claim 10, wherein the outputs from said amplifying circuits are 180° out of phase.

12. The system of claim 1, wherein said amplifier means includes a field-effect transistor.

13. The system of claim 1, wherein the output signal from said amplifier means comprises positive and negative signals, and said clipper means includes diode circuit means for permitting only the positive portions of the amplifier output signal which are greater than one-half of the average input signal level to said amplifier means pass therethrough, thereby effectively rejecting undesirable signals contained in the remaining portion of the amplifier output signal.

14. The system of claim 13, wherein said clipper means provides a DC output voltage signal and a positive pulse output signal, said DC output voltage signal being fed back to said automatic gain control means which comprises amplifier DC circuit means.

* * * * *